United States Patent
Steinlechner

(10) Patent No.: US 7,620,514 B2
(45) Date of Patent: Nov. 17, 2009

(54) METHOD AND ARRANGEMENT FOR CORRECTING AN ANGLE-MEASURING AND/OR DISTANCE-MEASURING SENSOR SYSTEM

(75) Inventor: Siegbert Steinlechner, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 34 days.

(21) Appl. No.: 10/587,536

(22) PCT Filed: Apr. 27, 2005

(86) PCT No.: PCT/EP2005/051888

§ 371 (c)(1),
(2), (4) Date: Jul. 26, 2006

(87) PCT Pub. No.: WO2005/124286

PCT Pub. Date: Dec. 29, 2005

(65) Prior Publication Data

US 2007/0174015 A1    Jul. 26, 2007

(30) Foreign Application Priority Data

Jun. 19, 2004    (DE) .................. 10 2004 029 815

(51) Int. Cl.
*G06F 19/00* (2006.01)
*G01R 35/00* (2006.01)

(52) U.S. Cl. ...................... 702/104; 702/111; 702/112; 702/191

(58) Field of Classification Search ......... 702/104–107, 702/113, 94–97, 111–112, 188–191
See application file for complete search history.

(56) References Cited

U.S. PATENT DOCUMENTS

| 4,753,308 | A | * | 6/1988 | Noto et al. ............... 180/446 |
| 5,612,906 | A | * | 3/1997 | Gotz ......................... 702/94 |
| 6,401,052 | B1 | | 6/2002 | Herb et al. |

FOREIGN PATENT DOCUMENTS

| DE | 43 31 151 | 3/1995 |
| DE | 199 11 822 | 8/2000 |
| DE | 100 34 733 | 2/2001 |
| DE | 101 54 153 | 5/2003 |

\* cited by examiner

*Primary Examiner*—Eliseo Ramos Feliciano
*Assistant Examiner*—Phuong Huynh
(74) *Attorney, Agent, or Firm*—Michael J. Striker

(57) ABSTRACT

In a method and a system for correcting an angle-measuring and/or distance-measuring sensor system, sinusoidal and cosinusoidal measurement signals ($x_i$, $y_i$) obtained by scanning a moved object of a measurement are evaluated. In order to correct the angle errors and/or phase errors of the measurement signal ($x_i$, $y_i$) a compensation process and a subsequent correction process are provided. Correction parameters ($m_1$, $m_2$) are obtained in the compensation process, and, in the correction process, a corrected pair of measured values ($x_{i'}$, $y_{i'}$) is determined form each pair of measured values ($x_i$, $y_i$).

4 Claims, 1 Drawing Sheet

METHOD AND ARRANGEMENT FOR CORRECTING AN ANGLE-MEASURING AND/OR DISTANCE-MEASURING SENSOR SYSTEM

BACKGROUND OF THE INVENTION

The present invention relates to a method and an arrangement for correcting an angle-measuring and/or distance-measuring sensor system.

Sensor systems designed to measure an angle when a rotating object of measurement is involved, or to measure a distance when a linearly moving object of measurement is involved are already known per se, with which the information to be obtained is represented by a pair of sinusoidal and cosinusoidal measurement signals. The information is usually represented by the amplitude and/or the phase of these measurement signals. The measurement signals often contain angle errors or phase errors, which result from manufacturing tolerances or other circuit-related details in the sensor system.

It is also known per se that sensor systems of this type are designed based on the principle of GMR (GMR=giant magneto resistance) in order to determine the angle of a magnetic field. GMR angular-position sensors of this type ideally output the following signals:

$$x_{ideal} = A \cdot \cos(\alpha)$$

$$y_{ideal} = A \cdot \sin(\alpha)$$

where A=amplitude. These signals are subsequently used to unambiguously determine angle $\alpha$ to be measured. GMR angular-position sensors of this type contain systematic errors, however, and the outputs therefore deliver the following signals:

$$x = A_1 \cdot \cos(\alpha) + x_0$$

$$y = A_2 \cdot \sin(\alpha + \delta) + y_0$$

Since the variable to be determined is angle $\alpha$, values $x_0$ and $y_0$ are the offsets of the angular-position sensor. Signal amplitudes $A_1$ and $A_2$ are usually different, and the phase shift between variables x and y is not exactly 90°; after subtracting the offset and normalizing for the same amplitude, the phase shift has phase error $\delta$.

Publication DE 101 54 153 A1, for example, makes known a method for the offset compensation of an angle-measuring and/or distance-measuring sensor system, with which the values for $x_0$ and $y_0$ are determined via measurement, but with which the conditions for amplitudes $A_1 = A_2$ and phase error $\delta = 0$ must be met.

In addition, a method is made known in DE 100 34 733 A1, with which amplitudes $A_1$ and $A_2$, values $x_0$ and $y_0$ and phase error $\delta$ are calculated from the measurement data. This calculation process is highly complex, so time is critical when it is used as a compensation process. Since the underlying equations are nonlinear in the required parameters, a nonlinear regression must be carried out; iteration and approximation procedures are used, which makes it impossible to calculate the amount of computing time required. The convergence properties of the known methods are highly dependent on whether or not a suitable initial solution has been selected, however. If an unfavorable selection has been made, methods of this type can be disadvantageous.

SUMMARY OF THE INVENTION

The generic method mentioned initially for correcting an angle-measuring and/or distance-measuring sensor system with which sinusoidal and cosinusoidal measurement signals obtained by scanning a moved object of measurement are evaluated and with which the angle errors and/or phase errors of the measurement signals are corrected is advantageously refined by the fact that the method is composed of a compensation process and a subsequent correction process; in the compensation process, offset values of the sinusoidal and cosinusoidal measurement signals and correction parameters are determined—from a specified number of pairs of measured values obtained by rotating the magnetic field—using the least squares of errors method and solving a linear system of equations. In the correction process, a corrected pair of measured values is subsequently determined out of each pair of measured values, and the angle to be measured is advantageously determined from the particular corrected pairs of measured values using a suitable algorithm.

The pairs of measured values determined in the compensation process according to the present invention are located on ellipses; the parameters of the ellipse are determined using the least squares of errors method. According to an advantageous embodiment, the derivative of the particular square of errors is determined with respect to the parameters of the ellipse, and the particular derivative is set equal to zero, to determine a minimum. The particular derivatives are now used to create the linear system of equations, so that, by using a suitable elimination process, the system of equations is solved for the required parameters of the ellipse and, based on this, the offset values and the correction parameters are determined.

An advantageous system for carrying out a method of this type is also provided, with which the sensor system is installed together with an evaluation circuit for correcting the measured values on an integrated microchip. The microchip with the sensor system and the evaluation circuit preferably includes interfaces for the input and/or output of data and/or parameters. As an advantageous exemplary embodiment, the microchip with the sensor system and the evaluation circuit are used as a steering angle sensor in a motor vehicle.

With the present invention it is therefore easily possible, in a first method part, to analyze the sensor errors of an individual sensor element and determine the associated parameters. In a second method part, the sensor errors can be subsequently corrected and/or compensated for using the evaluation circuit.

The advantage of the proposed means of attaining the object of the present invention is, in particular, that no iterations or approximations are required to determine the necessary sensor parameters, as is the case with the related art. The result of the evaluation is therefore always available after the same amount of computing time. This is particularly important when the sensor evaluation circuit is adjusted during manufacture, since the steps must be carried out in a fixed production cycle.

Any number of measured values N, e.g., N=100, can be used to calculate the sensor parameters; they are all taken into account according to the principle of the lowest sum of the squares of errors. Furthermore, not all of the parameters that were previously required are determined. Instead, only those parameters are determined that are required to correct the sensor signals, which is only four parameters in this case.

BRIEF DESCRIPTION OF THE DRAWINGS

An exemplary embodiment of a system for carrying out the method according to the present invention is explained with reference to the drawing.

DESCRIPTION OF THE PREFERRED EMBODIMENTS

Figure 1:
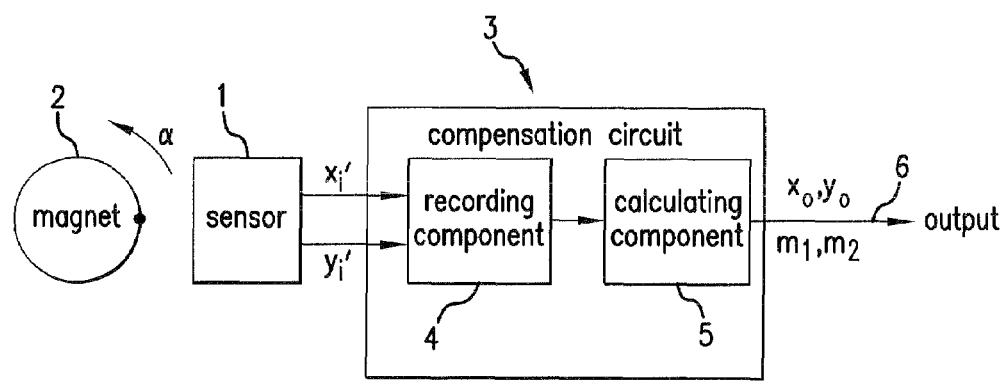
FIG. 1 shows a block diagram of a system of this type for carrying out a compensation process in an angle-measuring and/or distance-measuring sensor system.

FIG. 1 shows a block diagram of a system with which the sinusoidal and cosinusoidal signals x, y provided to measure an angle or distance are processed further by a sensor 1, e.g., an AMR or GMR sensor mentioned in the introduction of the description. Sensor 1 detects the change in the magnetic field of a magnet 2 resulting from an angular displacement α. N pairs of measured values x, y with N, i=1 ... N, e.g., N=100, pairs of measured values $x_i$, $y_i$, are subsequently recorded in a component 4 in a compensation circuit 3. The calculation of parameters explained below is subsequently carried out in a component 5, so that parameters $x_0$, $y_0$, $m_1$, $m_2$ in this case can be processed further at an output 6 for further evaluation in an evaluation circuit described with reference to FIG. 2.

Measured value pairs $x_i$, $y_i$, which were determined in the compensation process, are located on ellipses and satisfy the following equation, are processed by rotating magnet 2, the magnetic field direction of which is detected in sensor 1:

$$f(x,y) = w_1 \cdot x^2 + 2 \cdot w_2 \cdot x \cdot y + w_3 \cdot y^2 + 2 \cdot w_4 \cdot x + 2 \cdot w_5 \cdot y + 1 = 0.$$

Parameters $w_1 \ldots w_5$ are the parameters of the ellipse. To determine parameters $w_1 \ldots w_5$ from pairs of measured values $x_i$, $y_i$, a least squares of errors method is used to determine square of errors g:

$$g = \sum_{i=1}^{N} f(x_i, y_i)^2 = \min.$$

Square of errors g must be minimized with respect to each of the required parameters of the ellipse $w_1 \ldots w_5$. To do this, the derivative of the square of errors g is taken with respect to each of the parameters of the ellipse $w_1 \ldots w_5$, and the particular derivative is set equal to zero, to determine a minimum:

$$\frac{dg}{dw_j} = 0, \quad j = 1 \ldots 5.$$

The results can be used to create a linear system of equations, which can then be solved for the required parameters of the ellipse $w_1 \ldots w_5$, e.g., using Gaussian elimination or another suitable method.

A system of equations of this type can look like this:

$$\begin{bmatrix} sx4 & 2 \cdot sx3y & sx2y2 & 2 \cdot sx3 & 2 \cdot sx2y \\ sx3y & 2 \cdot sx2y2 & sxy3 & 2 \cdot sx2y & 2 \cdot sxy2 \\ sx2y2 & 2 \cdot sxy3 & sy4 & 2 \cdot sxy2 & 2 \cdot sy3 \\ sx3 & 2 \cdot sx2y & sxy2 & 2 \cdot sx2 & 2 \cdot sxy \\ sx2y & 2 \cdot sxy3 & sy3 & 2 \cdot sxy & 2 \cdot sy2 \end{bmatrix} \cdot \begin{bmatrix} w_1 \\ w_2 \\ w_3 \\ w_4 \\ w_5 \end{bmatrix} = \begin{bmatrix} -sx2 \\ -sxy \\ -sy2 \\ -sx \\ -sy \end{bmatrix}$$

The 13 different numerical values required in the system of equations shown above are calculated based on measured data $x_i$, $y_i$ according to the following relationships:

$$sx = \sum_{i=1}^{N} x_i \quad sy = \sum_{i=1}^{N} y_i \quad sxy = \sum_{i=1}^{N} x_i \cdot y_i$$

$$sx2 = \sum_{i=1}^{N} x_i^2 \quad sy2 = \sum_{i=1}^{N} y_i^2 \quad sx2y = \sum_{i=1}^{N} x_i^2 \cdot y_i$$

$$sx3 = \sum_{i=1}^{N} x_i^3 \quad sy3 = \sum_{i=1}^{N} y_i^3 \quad sxy2 = \sum_{i=1}^{N} x_i \cdot y_i^2$$

$$sx4 = \sum_{i=1}^{N} x_i^4 \quad sy4 = \sum_{i=1}^{N} y_i^4 \quad sxy3 = \sum_{i=1}^{N} x_i \cdot y_i^3$$

$$sx3y = \sum_{i=1}^{N} x_i^3 \cdot y_i$$

Using the parameters of the ellipse $w_1 \ldots w_5$ which have been obtained, required offset values $x_0$, $y_0$ and parameters $m_1$ and $m_2$ described above can now be calculated:

$$x_o = \frac{w_2 \cdot w_5 - w_3 \cdot w_4}{w_1 \cdot w_3 - w_2^2}$$

$$y_o = \frac{w_2 \cdot w_4 - w_1 \cdot w_5}{w_1 \cdot w_3 - w_2^2}$$

To calculate the two parameters $m_1$ and $m_2$, we must first calculate intermediate values v and r:

$$v = \sqrt{\frac{w_1 + w_3 - r}{w_1 + w_3 + r}} \quad mit \quad r = \sqrt{(w_1 - w_3)^2 + 4 \cdot w_2^2}$$

($mit$ = "where")

Required parameters $m_1$ and $m_2$ can now be calculated as follows:

$$m_1 = \frac{w_2}{r} \cdot \left( \frac{1}{v} - v \right)$$

$$m_2 = \frac{1}{2} \cdot \left( \left( \frac{1}{v} + v \right) - \left( \frac{1}{v} - v \right) \cdot \frac{w_1 - w_3}{r} \right).$$

As described with reference to FIG. 1, required offset values $x_0$, $y_0$ and parameters $m_1$ and $m_2$ are subsequently stored at output 6, and corrected pair of measured values $x_i'$, $y_i'$ is determined using the following relationships in a correction component 8 in evaluation circuit 7 shown in FIG. 2:

$$x_i' = x_i - x_0 \text{ and } y_i' = m_1 \cdot x_i' + m_2(y_i - y_0).$$

Figure 2:
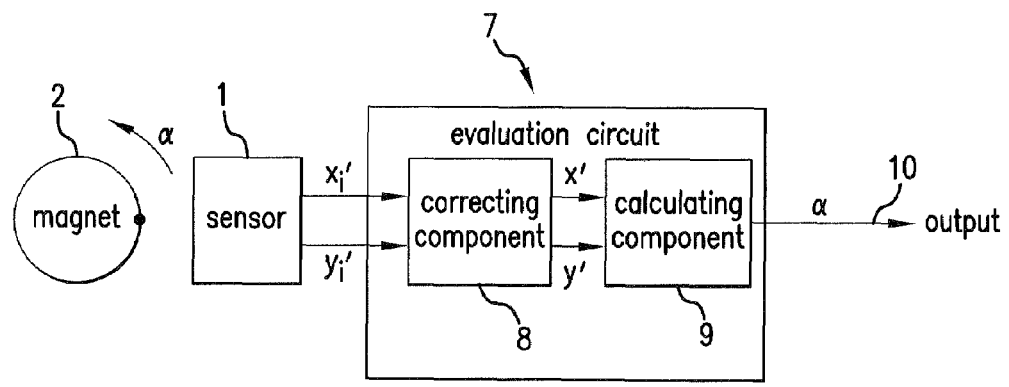
FIG. 2 shows a block diagram of the correction process and the determination of the output signal of the angle-measuring and/or distance-measuring sensor system.

Angle α—which corresponds to the rotation of magnet 2—to be measured in the system depicted in FIGS. 1 and 2 can be calculated unambiguously and exactly in a component 9 in evaluation circuit 7 based on the relationship α=arc(x'+i·y'), e.g., using a CORDIC algorithm or an a tan 2 function known from the C programming language, and it can be provided at an output 10 of evaluation circuit 7.

What is claimed is:

1. A method for correcting a sensor system selected from the group consisting of an angle-measuring sensor system, a distance-measuring sensor system, and an angle-and a distance-measuring sensor system comprising the steps of evaluating sinusoidal and cosinusoidal measurement signals ($x_i$, $y_i$) obtained by scanning a moved measurement object in a magnetic field;

correcting errors of the measurement signals ($x_i$, $y_i$) selected from the group consisting of angle errors, phase errors, and angle and phase errors providing for the correcting the sensor system a compensation process and a subsequent correction process;

in the compensation process, providing offset values ($x_o$, $y_0$) from a specified number (N of j=1 . . . N) of pairs of measured values ($x_i$, $y_i$) obtained by rotating a magnetic field, for the sinusoidal and cosinusoidal measurement signals ($x_i$, $y_i$) and correction parameters ($m_1$, $m_2$) by applying a least square of errors method and solving a linear system of equations;

determining a corrected pair of measured values ($x_i'$, $y_i'$) from each pair of the measured values ($x_i$, $y_i$) in the correction process, whereby determining the corrected pair of the measured values ($x_i'$, $y_i'$) in the correction process based on the relationship $x_i' = x_i - x_0$ and $y_i' = m_1 \cdot x_i' + m_2 \cdot (y_i - y_0)$, whereby determining the pair of measured values ($x_i$, $y_i$) in the compensation process located on ellipses and satisfying the following equation:

$f(x, y) = w_1 \cdot x^2 + 2 \cdot w_2 \cdot x \cdot y + w_3 \cdot y^2 + 2 \cdot w_4 \cdot x + 2 \cdot w_5 \cdot y \pm 1$, whereby determining parameters of elipses ($w_1$ . . . $w_5$) using the least square of errors (g) method, with $$g = \sum_{i=1}^{N} f(x_i, y_i)^2 = \min;$$

and determining with a processor an angle ($\alpha$) to be measured from particular corrected pairs of the measured values ($x_i'$, $y_i'$) using an algorithm and thereby providing the correction of the sensor system.

2. A method as defined in claim 1; and further comprising determining an angle ($\alpha$) to be measured in the correction process based on the relationship $\alpha = \arc(x' + i \cdot y')$.

3. A method as defined in claim 1; and further comprising determining a derivative of the square of errors (g) with respect to the parameters of the ellipse ($w_1$ . . . $w_5$), and setting a particular derivative equal to zero, to determine a minimum, and using the particular derivatives to create a linear system of equations, so that, using a suitable elimination process, the system of equations is solved for required parameters of the ellipse ($w_1$ . . . $w_5$) and the offset values ($x_0$, $y_0$) and the correction parameters ($m_1$, $m_2$) are determined.

4. A method as defined in claim 1, wherein the linear equation system corresponds to the equation $$\begin{bmatrix} sx4 & 2 \cdot sx3y & sx2y2 & 2 \cdot sx3 & 2 \cdot sx2y \\ sx3y & 2 \cdot sx2y2 & sxy3 & 2 \cdot sx2y & 2 \cdot sxy2 \\ sx2y2 & 2 \cdot sxy3 & sy4 & 2 \cdot sxy2 & 2 \cdot sy3 \\ sx3 & 2 \cdot sx2y & sxy2 & 2 \cdot sx2 & 2 \cdot sxy \\ sx2y & 2 \cdot sxy3 & sy3 & 2 \cdot sxy & 2 \cdot sy2 \end{bmatrix} \cdot \begin{bmatrix} w_1 \\ w_2 \\ w_3 \\ w_4 \\ w_5 \end{bmatrix} = \begin{bmatrix} -sx2 \\ -sxy \\ -sy2 \\ -sx \\ -sy \end{bmatrix}$$

and wherein $$sx = \sum_{i=1}^{N} x_i \quad sy = \sum_{i=1}^{N} y_i \quad sxy = \sum_{i=1}^{N} x_i \cdot y_i$$

$$sx2 = \sum_{i=1}^{N} x_i^2 \quad sy2 = \sum_{i=1}^{N} y_i^2 \quad sx2y = \sum_{i=1}^{N} x_i^2 \cdot y_i$$

$$sx3 = \sum_{i=1}^{N} x_i^3 \quad sy3 = \sum_{i=1}^{N} y_i^3 \quad sxy2 = \sum_{i=1}^{N} x_i \cdot y_i^2$$

$$sx4 = \sum_{i=1}^{N} x_i^4 \quad sy4 = \sum_{i=1}^{N} y_i^4 \quad sxy3 = \sum_{i=1}^{N} x_i \cdot y_i^3$$

$$sx3y = \sum_{i=1}^{N} x_i^3 \cdot y_i$$

is, and with the determined ellipse parameters $w_1 \ldots w_5$ $$x_0 = \frac{w_2 \cdot w_4 - w_1 \cdot w_5}{w_1 \cdot w_3 - w_2^2} \text{ and } y_0 = \frac{w_2 \cdot w_4 - w_1 \cdot w_5}{w_1 \cdot w_3 - w_2^2}$$

via the intermediate values $$v = \sqrt{\frac{w_1 + w_3 - r}{w_1 + w_3 + r}} \text{ with } r = \sqrt{(w_1 - w_3)^2 + 4 \cdot w_2^2}$$

and $$m_1 = \frac{w_2}{r} \cdot \left(\frac{1}{v} - v\right)$$

$$m_2 = \frac{1}{2} \cdot \left(\left(\frac{1}{v} + v\right) - \left(\frac{1}{v} - v\right) \cdot \frac{w_1 - w_3}{r}\right).$$

are calculated.

* * * * *